United States Patent [19]

Anzai

[11] Patent Number: 5,526,193
[45] Date of Patent: Jun. 11, 1996

[54] LENS MOUNTING STRUCTURE COMPRISING COLUMNS AND ADHESIVE

[75] Inventor: Susumu Anzai, Saitama, Japan

[73] Assignee: Fuji Xerox Co., Ltd., Tokyo, Japan

[21] Appl. No.: 324,975

[22] Filed: Oct. 18, 1994

[30] Foreign Application Priority Data

Dec. 20, 1993 [JP] Japan .................. 5-320148

[51] Int. Cl.$^6$ .................................. G02B 27/10
[52] U.S. Cl. .............................. 359/819; 359/811
[58] Field of Search ........................ 359/819, 811, 359/820, 871, 881, 198, 831

[56] References Cited

U.S. PATENT DOCUMENTS

| 1,727,889 | 9/1929 | McCabe | 359/811 |
| 2,259,006 | 10/1941 | Simmons | 359/819 |
| 5,191,483 | 5/1993 | Takizawa | 359/819 |
| 5,249,073 | 9/1993 | Takizawa | 359/206 |

FOREIGN PATENT DOCUMENTS

| 6184615 | 4/1986 | Japan | 359/819 |
| 63-57610 | 4/1988 | Japan . | |
| 319716 | 12/1989 | Japan | 359/198 |
| 3-89311 | 4/1991 | Japan . | |
| 0389311 | 4/1991 | Japan | 359/819 |
| 0495909 | 3/1992 | Japan | 359/819 |
| 3635637 | 7/1987 | Netherlands | 359/820 |

*Primary Examiner*—Georgia Y. Epps
*Assistant Examiner*—Ricky Mack
*Attorney, Agent, or Firm*—Finnegan, Henderson, Farabow, Garrett & Dunner

[57] ABSTRACT

The invention concerns a lens mounting structure which can reduce a displacement of the lens in the direction of mounting caused by the shrinkage of adhesive is reduced to enhance the lens mounting accuracy and to assure predetermined optical characteristics. The lens mounting structure in which an fθ lens (20) is supported by and adhered to a lens mount (22), includes support columns (30, 32), at the upper surface (30A) of which a protrusion (30B) is formed. The protrusion (30B) has a reference support point (30C) for supporting the fθ lens (20) on the mount (22). The fθ lens (20) comes into contact with this reference support point (30C), and a surface of the protrusion (30B), the upper surface (30A) of the support column (30) and a periphery of the fθ lens (20) surrounding a portion in which the fθ lens (20) comes into contact with the reference support point (30C), are adhered so as to mount the fθ lens (20).

11 Claims, 3 Drawing Sheets

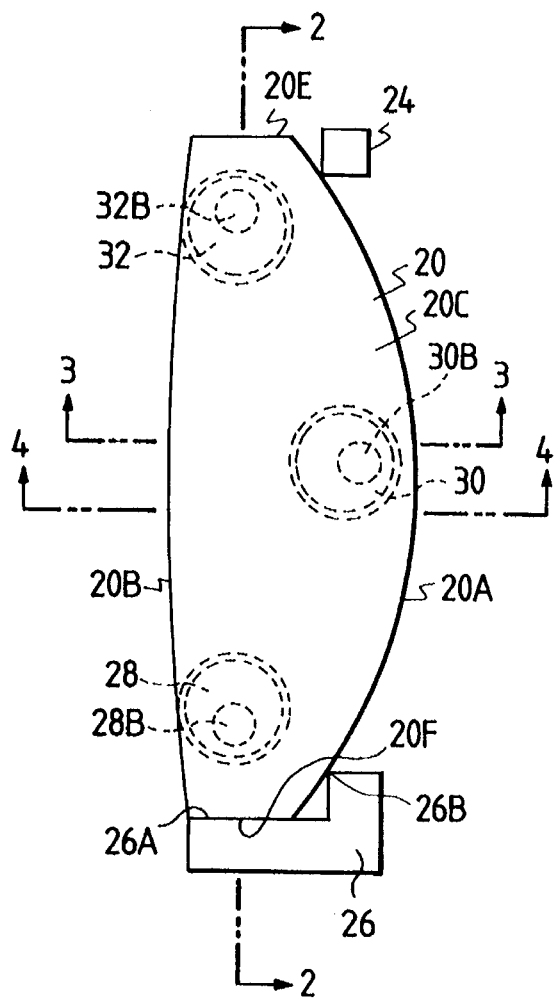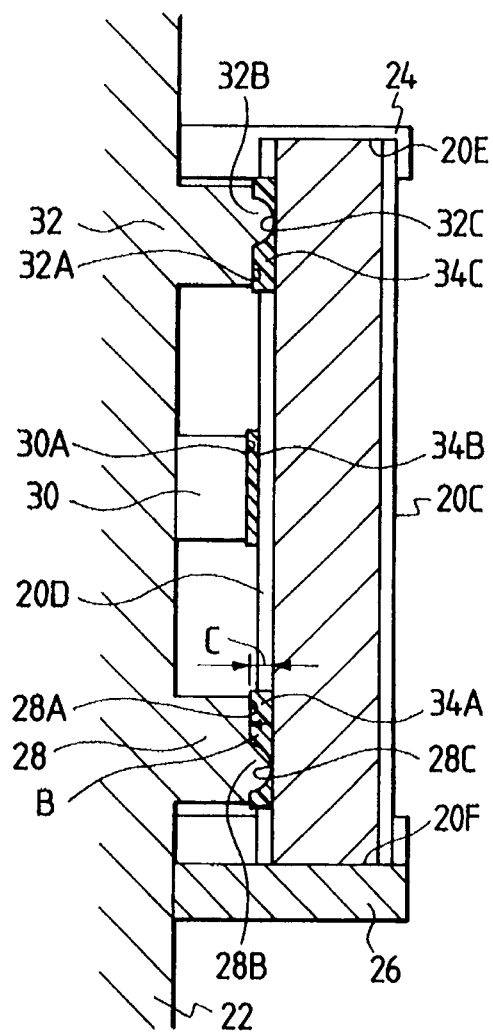

LENS MOUNTING STRUCTURE COMPRISING COLUMNS AND ADHESIVE

BACKGROUND OF THE INVENTION

The present invention relates to a mounting structure for mounting a lens in place, and more particularly relates to a mounting structure for an fθ lens used as a surface scanning lens of a laser printer or the like.

In an optical system of a laser printer or the like, the required performance with respect to the uniformity of scanning speed and the prevention of the curve of an image surface is ensured by using an fθ lens conducting the correction of the tilt caused on a rotational polygonal mirror. This fθ lens has an aberration in which an image forming position on a focal surface perpendicular to the optical axis of a lens changes in proportional to an angle θ formed between the optical axis of the lens and a beam of incident light. The fθ lens is generally supported by a mount through a mounting surface provided on the fθ lens.

The conventional lens mounting structure of the type described above is disclosed, for example, in Japanese Unexamined Utility Model Publication No. 63-57610 and Japanese Unexamined Patent Publication No. 3-89311.

In Japanese Unexamined Utility Model Publication No. 63-57610, in order to maintain the level of a lens by preventing the occurrence of burr in the process of molding a mount, a structure is disclosed in which the lens is attached to a mount on which a step portion is provided, the outer circumferential portion of which is formed low. However, in this Japanese Unexamined Utility Model Publication No. 63-57610, the lens is simply positioned on the mount and not fixed thereto. Therefore, this structure suffers from a problem in that when vibration is given to the mount, the lens is likely to be displaced.

According to Japanese Unexamined Patent Publication No. 3-89311, the following structure for mounting an fθ lens is disclosed: As illustrated in FIG. 6, a pair of flat reference support surfaces 13 are provided on the mount 12 for positioning the fθ lens 11 while the fθ lens 11 comes into contact with the pair of flat reference support surfaces 13. Further, an adhering surface 14 is provided between the pair of flat reference support surfaces 13 while the level of the adhering surface 14 is lower than that of the reference support surface 13 by a gap g. The adhering surface 14 and a portion of the flat mounting surface 11A of the fθ lens 11 are connected by the adhesive 16. Therefore, a lens distortion is not caused which deteriorates the accuracy of the lens by a difference between the thermal expansion coefficient of the fθ lens at the adhering portion and the thermal expansion coefficient of the mount 12. However, in this Japanese Unexamined Patent Publication No. 3-89311, a groove portion 15 for accommodating the adhesive 16 that has overflowed from the adhesive surface side is provided between the reference support surface 13 and the adhering surface 14. Therefore, as the reference support surface 13 and the adhering surface 14 are separated, it is not possible for the reference support surface 13 to prevent the displacement of the lens adhering portion 11B in the direction of the mount (in the direction of arrow A in FIG. 6), the displacement being caused by the shrinkage of the adhesive when the adhesive 16 is hardened and shrunk. For this reason, a distortion is caused in the lens, and predetermined optical characteristics can not be provided.

SUMMARY OF THE INVENTION

Giving consideration to the above facts, an objective of the present invention is to provide a simple lens mounting structure characterized in that: a displacement of the lens in the direction of mounting caused by the shrinkage of adhesive is reduced, whereby the lens mounting accuracy is enhanced as well as predetermined optical characteristics can be obtained.

In order to attain the above-noted and other objectives, the present invention provides a lens mounting structure for supporting a lens, the structure comprising: a lens mount; and a plurality of support columns, each projecting from the lens mount and having a distal end; wherein: the lens is supported by and fixed to the lens mount through the support columns such that the distal end is kept in direct contact with the lens and a portion of the lens circumscribing and contiguous to the distal end is adhered to respective one of the support columns. The distal end is preferably in point contact with the lens, but may be in surface contact with the lens.

More specifically, the present invention provides a lens mounting structure in which a lens is supported by and adhered to a lens mount, comprising a plurality of support columns having a reference support surface for supporting the lens on the mount, wherein the lens comes into contact with this reference support surface, and a side of the support column, a periphery of the mount surrounding the support column and a periphery of the lens surrounding a portion in which the lens comes into contact with the reference support surface, are adhered so as to mount the lens.

In the lens supporting structure, a plurality of support columns having a reference support surface for supporting the lens is provided on the mount, and the lens is contacted with this reference support surface. A side of the support column, a periphery of the mount surrounding the support column and a periphery of the lens surrounding a portion in which the lens comes into contact with the reference support surface, are adhered. Due to the foregoing, when the adhesive is hardened and shrunk, a displacement of the adhering portion of the lens caused by the shrinkage of adhesive in the direction of the mount can be prevented by the reference support surface of the mount adjacent to this adhering portion. Therefore, the displacement of the lens in the direction of the mount can be minimized.

Since the support column is embedded in the adhesive, an amount of adhesive to be applied can be reduced by an amount of the volume of the support column.

The invention further provides a lens mounting structure in which a lens is supported by and adhered to a lens mount, comprising a plurality of support columns, at the fore end surface of which a protrusion is formed, said protrusion having a reference support surface for supporting the lens on the mount, wherein the lens comes into contact with this reference support surface, and a side of the protrusion, a fore end surface of the support column and a periphery of the lens surrounding a portion in which the lens comes into contact with the reference support surface, are adhered so as to mount the lens.

In the lens mounting structure, a plurality of support columns are provided, at the fore end surface of which a protrusion is formed, the protrusion having a reference support surface for supporting the lens on the mount, wherein the lens comes into contact with this reference support surface, and a side of the protrusion, a fore end surface of the support column and a periphery of the lens surrounding a portion in which the lens comes into contact with the reference support surface, are adhered. Accordingly, when the adhesive is hardened and shrunk, a displacement of the adhering portion of the lens caused by the shrinkage of adhesive in the direction of the mount can be prevented by the reference support surface of the mount adjacent to this adhering portion. Therefore, the displacement of the lens in the direction of the mount can be minimized.

Since the protrusion is embedded in the adhesive, an amount of adhesive to be applied can be reduced by an amount of the volume of the protrusion.

The invention further provides a lens mounting structure in which a lens is supported by and adhered to a lens mount, comprising a plurality of support columns having a reference support point for supporting the lens on the mount, wherein the lens comes into contact with this reference support point, and a surface of the support column, a periphery of the mount around the support column and a periphery of the lens in a portion in which the lens comes into contact with the reference support point, are adhered so as to mount the lens.

In the lens mounting structure, there is provided a plurality of support columns having a reference support point for supporting the lens on the mount, wherein the lens comes into contact with this reference support point, and a surface of the support column, a periphery of the mount around the support column and a periphery of the lens in a portion in which the lens comes into contact with the reference support point, are adhered. Therefore, when the adhesive is hardened and shrunk, a displacement of the adhering portion of the lens caused by the shrinkage of adhesive in the direction of the mount can be prevented by the reference support point of the mount adjacent to this adhering portion. Therefore, the displacement of the lens in the direction of the mount can be minimized.

The invention further provides a lens mounting structure in which a lens is supported by and adhered to a lens mount, comprising a plurality of support columns, at the fore end surface of which a protrusion is formed, said protrusion having a reference support point for supporting the lens on the mount, wherein the lens comes into contact with this reference support point, and a surface of the protrusion, a fore end surface of the support column and a periphery of the lens surrounding a portion in which the lens comes into contact with the reference support point, are adhered so as to mount the lens.

In the lens mounting structure, there is provided a plurality of support columns, at the fore end surface of which a protrusion is formed, the protrusion having a reference support point for supporting the lens on the mount, wherein the lens comes into contact with this reference support point, and a surface of the protrusion, a fore end surface of the support column and a periphery of the lens surrounding a portion in which the lens comes into contact with the reference support point, are adhered. Therefore, when the adhesive is hardened and shrunk, a displacement of the adhering portion of the lens caused by the shrinkage of adhesive in the direction of the mount can be prevented by the reference support point of the mount adjacent to this adhering portion. Therefore, the displacement of the lens in the direction of the mount can be minimized.

In addition, in case where the lens is supported in the manner of point contact, the accuracy of the mounting can be made higher than that obtainable from the structure utilizing surface contact.

BRIEF DESCRIPTION OF THE DRAWINGS

FIG. 1 is a plan view of the fθ lens attaching structure according to the example of the present invention.

FIG. 2 is a sectional view taken on line 2—2 in FIG. 1.

DETAILED DESCRIPTION OF THE PREFERRED EMBODIMENT

Figure 3:
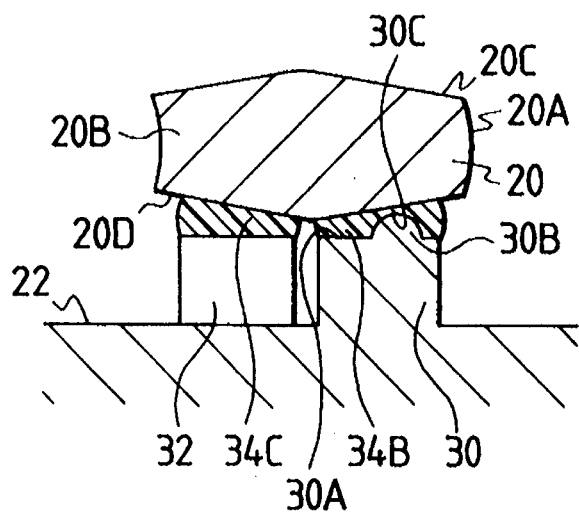
FIG. 3 is a sectional view taken on line 3—3 in FIG. 1.

With reference to FIGS. 1 to 5, a preferred embodiment of the present invention will be explained in detail as follows.

FIG. 1 is a view showing an example of the present invention. FIG. 1 shows an example in which the present invention is applied to a structure for mounting an fθ lens used for an optical system of a laser printer.

As illustrated in FIG. 1, the fθ lens 20 includes: a convex lens surface 20A composed of an aspheric surface (shown in FIG. 3); a lens surface 20B formed into a concave in the subsidiary scanning direction and also formed into a convex in the primary scanning direction, the lens surface 20B being opposed to the lens surface 20A; an upper surface 20C and a lower surface 20D crossing these lens surfaces 20A and 20B, the upper and lower surfaces 20C and 20D being formed into a shape protruding outside at the center; and a pair of flat sides 20E and 20F (shown in FIG. 1). As illustrated in FIG. 2, this fθ lens 20 is attached to a mount 22 formed integrally with an optical housing not shown in the drawing.

As illustrated in FIG. 1, the mount 22 includes: a square-pole-shaped positioning member 24 coming into contact with the lens surface 20A on the side 20E of the fθ lens, the square-pole-shaped positioning member 24 being provided for positioning; a guide surface 26A coming into contact with the side 20F of the fθ lens 20; and a contact portion 26B coming into contact with the lens surface 20A on the side 20F of the fθ lens 20. An approximately L-shaped positioning member 26 is fixed to the mount 22.

Figure 4:
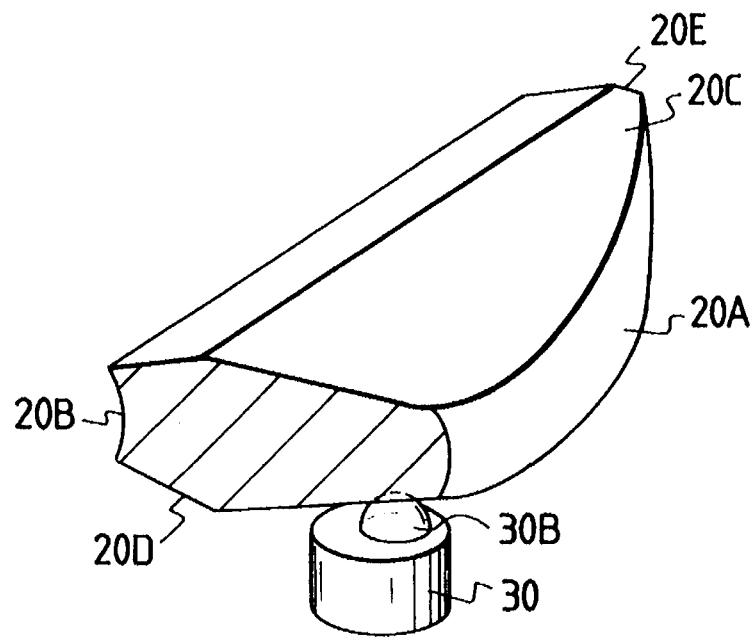
FIG. 4 is a perspective view of the lens taken on line 4—4 in FIG. 1 before the adhesion and combination, wherein the view is taken from a diagonally upper position.

Further, the mount 22 includes three approximately cylindrical support columns 28, 30, 32, which are separately disposed, for supporting and fixing the fθ lens 20, wherein the support columns 28 and 32 are provided on both sides of the fθ lens 20 with respect to the longitudinal direction, and the support column 30 is provided approximately at the center of the fθ lens 20 on the lens surface 20A side. As illustrated in FIG. 2, concerning these support columns 28, 30, 32, approximately hemispherical protrusions 28B, 30B, 32B of which the protrusion 30B is shown in FIG. 4) are respectively formed on the upper surfaces 28A, 30A, 32A on the fθ lens 20 side. The fθ lens 20 comes into contact with reference support points 28C, 30C, 32C at the tops of the protrusions 28B, 30B, 32B, and adhesive agents 34A, 34B, 34C are applied between the upper surfaces 28A, 30A, 32A of the support columns 28, 30, 32 and the bottom surface 20D of the fθ lens 20. A gap C between the upper surfaces 28A, 30A, 32A of the support columns 28, 30, 32 and the bottom surface 20D of the fθ lens 20 may be appropriately set in accordance with the viscosity of the adhesive agents 34A, 34B, 34C, and it is preferable to set the gap C in a range from 0.001 mm to 2 mm.

In this case, the fθ lens 20 is attached in the following manner: For example, after adhesive agents 34A, 34B, 34C of which the viscosity is relatively high have been coated on the upper surfaces 28A, 30A, 32A of the support columns 28, 30, 32 and also coated on the surfaces of the protrusions 28B, 30B, 32B around the reference support points 28C, 30C, 32C, the fθ lens 20 is positioned by the positioning members 24, 26 so as to be supported by the support columns 28, 30, 32, and then the adhesive agents 34A, 34B, 34C are hardened. Alternatively, the fθ lens 20 is positioned by the positioning members 24, 26 so as to be supported by the support columns 28, 30, 32. Under the above condition, adhesive agents 34A, 34B, 34C of which the viscosity is relatively low (having the penetration property) are coated between the bottom surface 20D of the fθ lens 20 and the upper surfaces 28A, 30A, 32A of the support columns 28, 30, 32 and also coated on the surfaces of the protrusions 28B, 30B, 32B around the reference support points 28C, 30C, 32C, and then the adhesive agents 34A, 34B, 34C are hardened, so that the fθ lens 20 can be attached. In this case, the reference support points 28C, 30C, 32C of the fθ lens 20 and upper positions around the reference support points may be pushed to the mount 22 side.

As described above, in this example, the fθ lens 20 comes into contact with the reference support points 28C, 30C, 32C of the protrusions 28B, 30B, 32B of the support columns 28, 30, 32 formed on the mount 22. Peripheries of the contact portions are adhered, in where the surfaces of the protrusions 28B, 30B, 32B around the reference support points of the bottom surface 20D of the fθ lens are contacted with the upper surfaces 28A, 30A, 32A of the support columns 28, 30, 32. That is, the fθ lens 20 is adhered onto the mount 22 at positions adjacent to the reference support points 28B, 30B, 32B. Therefore, even when the adhesive agents 34A, 34B, 34C are hardened and shrunk, it is possible to prevent an adhering portion in which the fθ lens 20 is adhered onto the mount 22, from being displaced in the direction of the mount 22 (in the direction of the arrow B in FIG. 2) by the actions of the reference support points 28B, 30B, 32B. Due to the foregoing, a displacement of the fθ lens in the direction of the mount 22 can be made minute.

A surplus adhesive agent flows from the upper surfaces 28A, 30A, 32A of the support columns 28, 30, 32 onto the mount 22 close to the support columns. Therefore, when the fθ lens 20 is pressed against the protrusions 28B, 30B, 32B in the case where the fθ lens 20 is adhered to the support columns 28, 30, 32, the adhesive agents on the upper portions of the protrusions 28B, 30B, 32B flows down onto the mount 22. Accordingly, the lens surfaces 20A, 20B of the fθ lens 20 are not stained with the adhesive agents. For this reason, the control range of a coating amount of the adhesive agent can be widely set, so that the lens attaching structure of the invention can be appropriately adopted to mass production. Further, it is possible to use an adhesive agent, the viscosity of which is so high and not less than several thousands cp, can be applied. In addition to that, the positioning members 24, 26 are used, so that the fθ lens 20 can be easily positioned in the process of adhesion, and the labor required for attaching the fθ lens can be reduced.

Figure 5A:
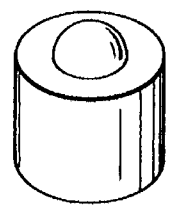
FIGS. 5(A) to 5(D) are perspective views showing examples of the profile of the support column of the mount which can be applied to the lens attaching structure of the present invention.
Figure 5B:
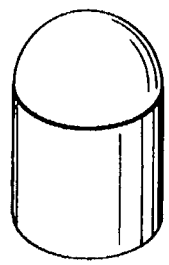
Figure 5C:
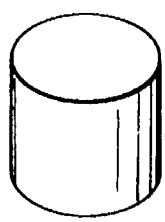
Figure 5D:
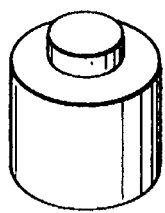
Figure 6:
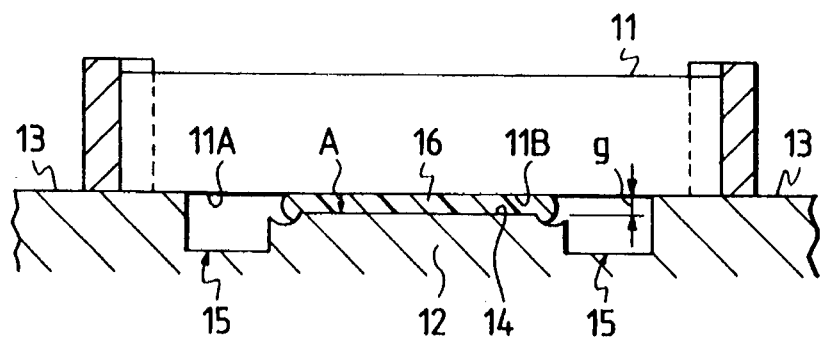
FIG. 6 is a sectional view showing the conventional lens attaching structure.

As illustrated in FIG. 5(A), in the above example, a profile of the protrusion is hemispheric (In FIG. 5(A), the protrusion is formed approximately at the center of the support column). Since the structure is required to be suitable for supporting the lens at points, not only a hemisphere but also a circular cone and a pyramid may be adopted for the protrusion. Also, a surface of the support column on the lens side may be formed into a hemisphere shown in FIG. 5(B), or a circular cone or a pyramid so as to support the lens at a point. Further, the support column may be formed into a circular cylinder as shown in FIG. 5(C), or a polygonal column. Further, the support column may be provided with a cylindrical or polygonal protrusion as shown in FIG. 5(D) so that the lens surface can be supported. In this connection, in the case where the support column is not provided with a protrusion as shown in FIGS. 5(B) and 5(C), it is preferable that the periphery of the reference support surface or reference support point of the lens, the side of the support column (in the case of FIG. 5(B), the support column surface), and the periphery of the support column of the mount are adhered and joined together.

In the example of the present invention, the support column and the protrusion are embedded in the adhesive agent. Therefore, an amount of the adhesive agent to be used can be reduced by a volume of the support column or the protrusion. Especially when a support column having a protrusion shown in FIGS. 5(A) and 5(D) is adopted, an amount of the adhesive agent to be used can be greatly reduced.

Of course, this example can be applied to a strip-shaped glass lens of which the bottom surface is flat. Especially, in the structure shown in FIGS. 5(A) or 5(B) in which the lens is supported at a point, the lens shown in FIG. 3 of which the bottom surface is tapered can be preferably used. This structure is frequently used in recent years. This structure can be applied to a lens made of plastic which requires a mold-releasing-gradient in the process of resin molding.

As the present invention is constructed in the manner described above, the following effects are provided: A displacement in the lens attaching direction caused by the shrinkage of an adhesive agent is reduced, so that the lens attaching accuracy can be enhanced and predetermined optical characteristics can be provided, and further the lens can be simply attached.

What is claimed is:

1. A lens mounting structure for supporting a lens, said structure comprising:

a lens mount; and a plurality of support columns, each projecting from said lens mount and having a distal end;

said lens being supported by and fixed to said lens mount through said support columns such that each said distal end is kept in direct contact with said lens, said structure further comprising an adhesive circumscribing and contiguous to each said distal end to fix portions of said lens to said support columns, respectively.

2. A lens mounting structure according to claim 1, wherein said distal end is in point contact with said lens.

3. A lens mounting structure according to claim 1, wherein said distal end is in surface contact with said lens.

4. A lens mounting structure according to claim 1, wherein each of said support column has a hemispherical portion to define said distal end.

5. A lens mounting structure according to claim 4, wherein said hemispherical portion defines a gap between said portion of said lens and said respective one of said support column.

6. A lens mounting structure according to claim 1, wherein each of said support columns has a cylindrical portion to define said distal end.

7. A lens mounting structure according to claim 6, wherein said cylindrical portion defines a gap between said portion of said lens and said respective one of said support columns.

8. A lens mounting structure in which a lens is supported by and adhered to a lens mount, comprising a plurality of support columns having a reference support surface for supporting the lens on the mount, wherein the lens comes into contact with the reference support surface, and wherein a side of each support column, a periphery of the mount surrounding each support column and a periphery of the lens surrounding a column portion at which the lens comes into contact with the reference support surface, are adhered so as to mount the lens.

9. A lens mounting structure in which a lens is supported by and adhered to a lens mount, comprising a plurality of support columns each having a fore end surface on which a protrusion is formed, said protrusion having a reference support surface for supporting the lens on the mount, wherein the lens comes into contact with the reference support surface, and wherein a side of the protrusion, the fore end surface of the support column and a periphery of the lens surrounding a column portion at which the lens comes into contact with the reference support surface, are adhered so as to mount the lens.

10. A lens mounting structure in which a lens is supported by and adhered to a lens mount, comprising a plurality of support columns each having a reference support point for supporting the lens on the mount, wherein the lens comes into contact with the reference support point, and wherein a surface of the support column, a periphery of the mount around the support column and a periphery of the lens about a column portion at which the lens comes into contact with the reference support point, are adhered so as to mount the lens.

11. A lens mounting structure in which a lens is supported by and adhered to a lens mount, comprising a plurality of support columns each having a fore end surface on which a protrusion is formed, said protrusion having a reference support point for supporting the lens on the mount, wherein the lens comes into contact with the reference support point, and wherein a surface of the protrusion, the fore end surface of the support column and a periphery of the lens surrounding a column portion at which the lens comes into contact with the reference support point, are adhered so as to mount the lens.

* * * * *